United States Patent [19]

Luch et al.

[11] Patent Number: 5,398,836
[45] Date of Patent: * Mar. 21, 1995

[54] CONTAINER WITH TAMPER-EVIDENT BAND HAVING INWARD BENT RETAINER PROJECTION TO RETAIN A LID AND METHOD OF BENDING SAID PROJECTION

[75] Inventors: Daniel Luch, Morgan Hill; Rawson Chenault, Newark, both of Calif.

[73] Assignee: Portola Packaging, Inc., San Jose, Calif.

[*] Notice: The portion of the term of this patent subsequent to Nov. 17, 2009 has been disclaimed.

[21] Appl. No.: 35,408

[22] Filed: Mar. 23, 1993

[51] Int. Cl.⁶ .............................................. B65D 17/40
[52] U.S. Cl. ...................................... 220/276; 220/270
[58] Field of Search ................................ 220/270, 276

[56] References Cited

U.S. PATENT DOCUMENTS

| 3,884,393 | 5/1975 | Wassilieff | 220/276 X |
| 4,024,976 | 5/1977 | Acton | 220/276 X |
| 4,190,175 | 2/1980 | Allen | 220/270 |
| 4,708,255 | 11/1987 | Thompson . | |
| 4,709,824 | 12/1987 | Thompson . | |
| 4,711,364 | 12/1987 | Letica | 220/276 |
| 4,793,506 | 12/1988 | Thompson . | |
| 4,811,857 | 3/1989 | Thompson . | |
| 4,823,967 | 4/1989 | Thompson . | |
| 4,856,667 | 8/1989 | Thompson . | |
| 4,872,304 | 10/1989 | Thompson . | |
| 4,998,622 | 3/1991 | Drack | 206/519 |
| 5,052,574 | 10/1991 | McKinnon | 220/276 |
| 5,163,575 | 11/1992 | Luch et al. | 220/276 |
| 5,170,905 | 12/1992 | Luch | 220/276 |
| 5,249,694 | 10/1993 | Nelson | 220/276 |
| 5,307,948 | 5/1994 | Blackburn et al. | 220/269 |

FOREIGN PATENT DOCUMENTS

2219284  6/1989  United Kingdom ................ 220/276

Primary Examiner—Allan N. Shoap
Assistant Examiner—Stephen Cronin
Attorney, Agent, or Firm—Julian Caplan

[57] ABSTRACT

A thin-walled, cup shaped container molded of polypropylene, or other suitable material, is formed with a tamper-evident band initially positioned outside the lip at the top of the container wall. The lower edge of the band is connected to the container by spaced frangible bridges. A lid closes off the top of the container and has an outer and inner skirt respectively fitting outside and inside the container lip. The upper end of the band is formed into an annular inward projection overlying the periphery of the lid. Forming the retainer projection is accomplished by bringing a heated tool in contact with the band to heat the same until near its melting temperature. The tool has slanted walls converging at a radius and shaped to bend the projection approximately horizontally inward. The lid cannot be removed without tearing off the band.

16 Claims, 5 Drawing Sheets

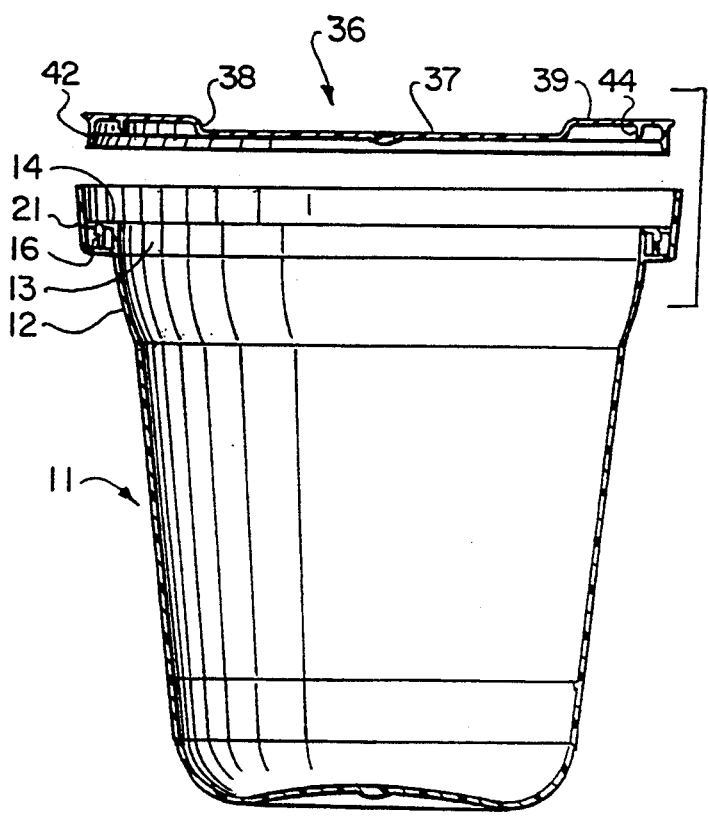
FIG.1
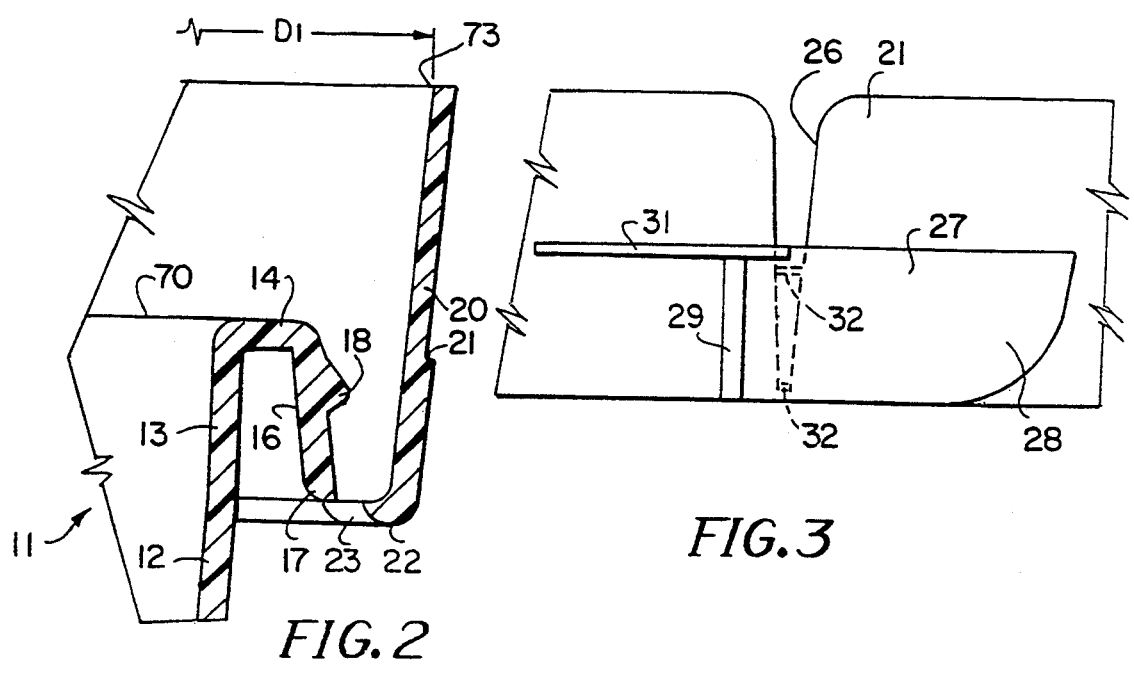
FIG.2
FIG.3

CONTAINER WITH TAMPER-EVIDENT BAND HAVING INWARD BENT RETAINER PROJECTION TO RETAIN A LID AND METHOD OF BENDING SAID PROJECTION

BACKGROUND OF THE INVENTION

1. Field of the Invention

This invention relates to a new and improved container of a thin-walled plastic suitable for yogurt and other dairy products closed with a lid. The container has a tamper-evident band attached thereto by frangible bridges. The upper portion of the band is heated and bent to form an inwardly directed annular projection at approximately a 90° angle to retain the lid so that it cannot be removed without separating the band from the container thereby rendering the container tamper-evident. The invention further comprises the method of bending the band to form the projection.

2. Description of Related Art

The use of tamper-evident bands to retain lids on containers of this general type are known in the art. Letica U.S. Pat. No. 4,711,364 shows such a construction but the lid is held in place by snap action of the lid and the lip on the upper end of the container. In the present invention, the tamper-evident band is heated and bent inward to secure the lid in place. Cooperating locking beads on the lid and container are primarily for re-closure purposes.

Applicants' U.S. Pat. No. 5,163,575 shows a tamper-evident band curled to secure a lid in place. However, the curl of the lid is, in cross-section, of a curvature, approximately 180° or greater, whereas in the present invention the upper portion of the band is formed in an inward directed annular projection which fits on top of the lid.

Curling of plastic cylindrical bands is known in the art. For example, applying a concave tool to the edge of a cylindrical plastic member is shown in numerous patents to Thompson, such as U.S. Pat. Nos. 4,708,255; 4,709,824; 4,793,506; 4,872,304; 4,823,967; 4,811,857; and 5,856,667. These patents disclose a curled bead which is resilient and compressed when a screw closure is applied to a container neck. Similar curling techniques are employed in the present invention, but the resulting annular projection is employed for a totally different purpose and is shaped in a different manner than are the curled beads of the foregoing Thompson patents.

SUMMARY OF THE INVENTION

The container of the present invention is initially molded with a straight walled, somewhat upwardly-outwardly slanted, tamper-evident band spaced outwardly of, but connected to, the outside of the container body through a frangible line of weakness. In the particular form of the invention shown in the accompanying drawings, the container has an outward extending lip from which depends a short skirt and the lower edge of the tamper-evident band is connected to the lower edge of the skirt by spaced bridges. A lid may be applied to the container either before or after bending the band. When applied prior to bending the band, the lid has inner and outer depending lid skirts which engage the inside of the container wall and the outside of the container skirt. Preferably interlocking beads on the lid outer skirt and the container outer skirt snap over each other to hold the lid in position.

A heated tool is brought into contact with the upper edge of the tamper-evident band for a sufficient time to warm the band and render it flexible. The tool has a concavity in its bottom surface shaped so that the upper edge of the band engages an outwardly-downwardly slanted surface of the tool.

After the band has been sufficiently heated, the tool is brought downwardly. The combination of heat and pressure bends the band into an inward directed annular projection which fits over the lid. The shape of the cavity of the tool accomplishes the bending of the band to form the projection. In most cases the projection is bent downwardly-inwardly beyond 90° and held in such position for a short interval, whereupon the tool is withdrawn and the projection cools. The result of this operation is a smooth annular projection which overlies the lid.

Alternatively, the tamper-evident band may be bent first and the lid applied after bending. The lower edge of the lid and the projection are so shaped that downward pressure of the lid forces the projection downwardly and outwardly until the lid snaps in place under the projection.

The projection holds the lid in place so that the container is tamper proof. At one position around its circumference a notch is formed in the band, and a tear tab is connected to the band adjacent the notch. By pulling the tear tab, the tear band is removed, permitting removal of the lid. If an attempt is made to remove the lid before the tear band has been removed, the tear band is visibly damaged, making the combination tamper-evident.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a vertical mid-sectional view of a container and lid in accordance with the present invention.

FIG. 2 is a greatly enlarged, fragmentary sectional view through the upper portion of the container and the tamper-evident band.

FIG. 3 is an enlarged, side elevational view of the tear band in the area of the tear tab.

DETAILED DESCRIPTION OF THE PREFERRED EMBODIMENTS

Figure 4:
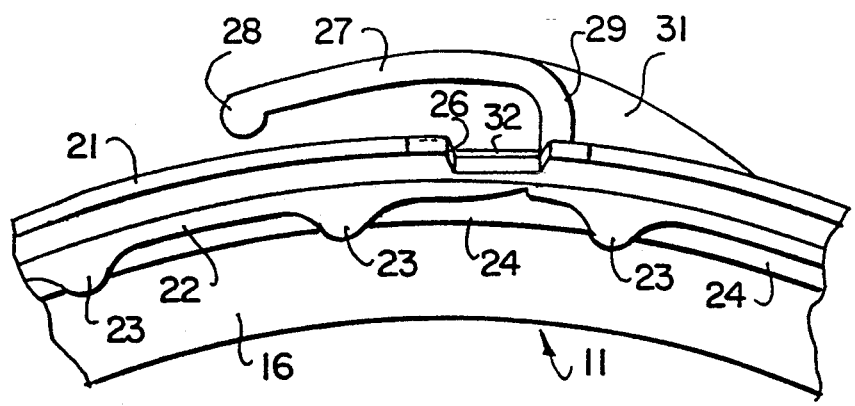
FIG. 4 is a top plan view of the structure of FIG. 3.
Figure 5:
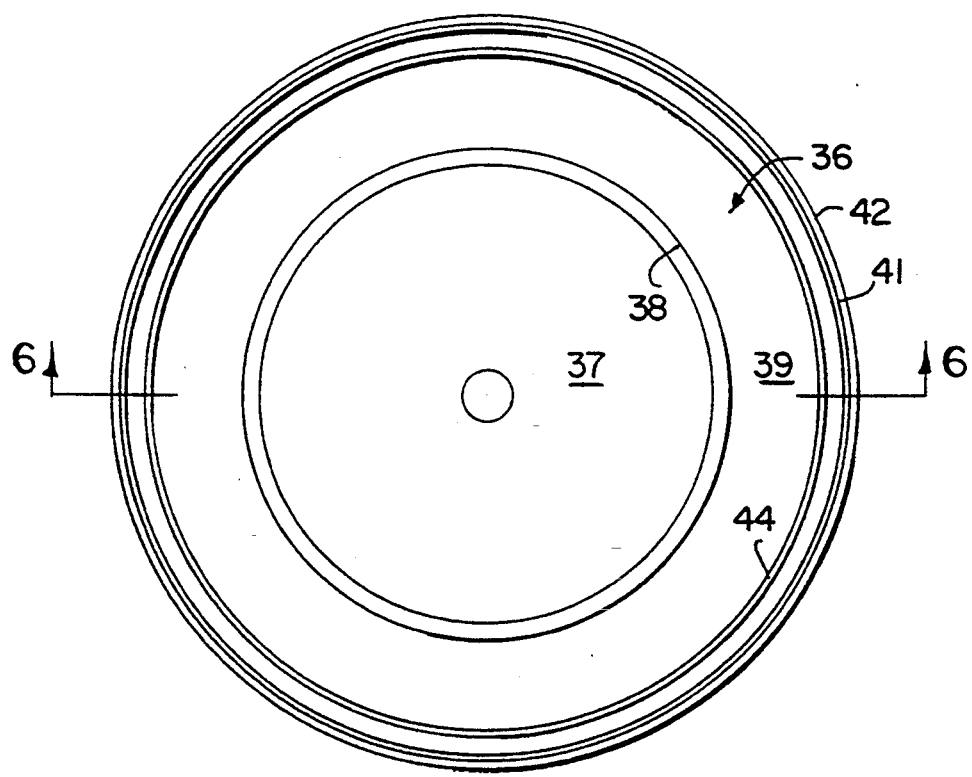
FIG. 5 is a plan view of a lid.
Figure 6:
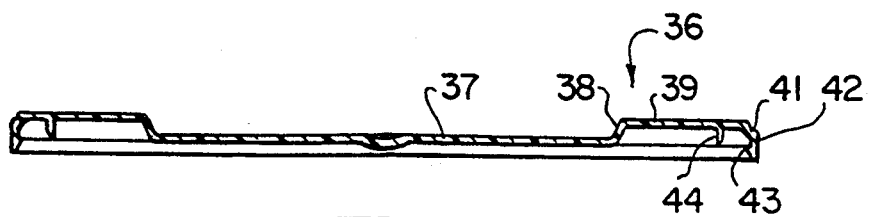
FIG. 6 is a sectional view taken substantially along the line 6—6 of FIG. 5.
Figure 7:
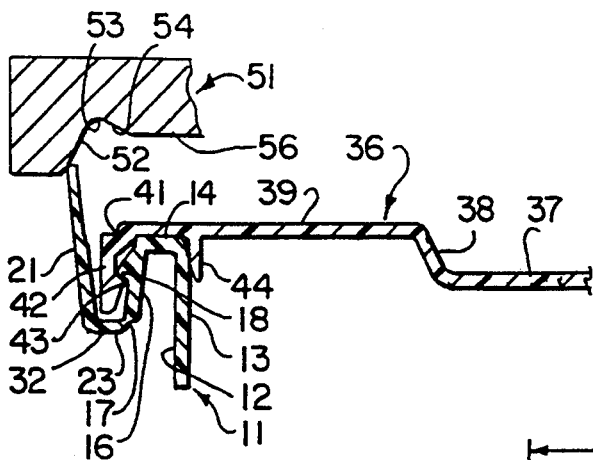
FIG. 7 is a view similar to FIG. 2 showing a portion of the lid engaging the container before the band is bent.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

It will be understood that the structure of container is subject to considerable variation. It is essentially a thin-walled, wide mouth container of the type used for yogurt and dairy products such as margarine, cottage cheese and the like. The material of construction of the container 11 is important to the formation of the container flange. One particular suitable plastic material manufactured by Eastman Plastics is Tenite ® polypropylene P4C6B-024. Such a plastic has a softening temperature of approximately 306° F., a deflection temperature at 264 PSI of 144° F. and a deflection temperature at 66 PSI of 223° F.

As shown in the accompanying drawings, container 11 comprises a body having a conical wall 12 which merges into a substantially vertical upper wall 13. Lip 14 extends outwardly surrounding open end 70 at the upper edge of wall 13. A downwardly-outwardly diverging container skirt 16 depends from the outer edge of lip 14 and terminates in a curved lower edge 17. Approximately midway of the length of container skirt 16 is an outward projecting locking bead 18 having a substantially horizontal bottom shoulder.

Spaced outwardly of skirt 16 is tamper-evident band 21 which is thin-walled and slants somewhat outwardly upwardly to a height above lip 14. The upper, inner edge of band 21 defines an upper most diameter $D_1$. Band 21 above break 20 is thinner than it is below break 20. The lower end 22 of band 21 is curved and is connected to the lower edge 17 by a plurality of bridges 23 separated by gaps 24. A preferred arrangement of bridges 23 and gaps 24 is best shown in FIG. 4. It will be seen that there is a line of weakness at the connection of the lower edge of the band 21 and the cap skirt 16. Such a line of weakness may be created by means other than the bridges and gaps shown.

As shown in FIGS. 3 and 4, in at least one location, the upper edge of band 21 is formed with a notch 26 which extends from top to bottom thereof. At least one thin connector 32 extends from side to side of notch 26 to retain the band in shape. Tear tab 27 extends along the lower portion of band 21 and has a curved free end 28 which facilitates the consumer gripping the tab 27. Preferably tab 27 is outwardly offset relative to band 21 (see FIG. 4) and is connected thereto by an inward curve connector portion 29. Gusset 31 is horizontally disposed and connects the tab 27 to the wall of band 21 at a position spaced from the notch 26. The function of gusset 31 is to prevent the tab 27 from being torn off when pulled since its function is to tear away the band 21 at the line of weakness formed by the bridges 23 and gaps 24.

Lid 36 is likewise subject to considerable modification in structure. In the form shown, lid 36 has a central depressed panel 37 which merges with an outward-upward directed short wall 38. On the outside of wall 38 is an annular ring 39 dimensioned to fit on top of the lip 14 of container 11. The outer edge of ring 39 may be formed with a circular stacking notch 41. Depending from the lower edge of ring 39 is outer skirt 42 dimensioned to fit outside of container skirt 16. The inner surface of skirt 42 is preferably formed with an internal bead 43 which snaps under the bead 18 and secures the lid 36 on the container 11 against unintentional dislodgement. Also depending from the underside of ring 39 is inner skirt 44 which fits inside the upper wall 13. When lids 36 are stacked, the lower edge of skirt 42 nests in notch 41.

Figure 9:
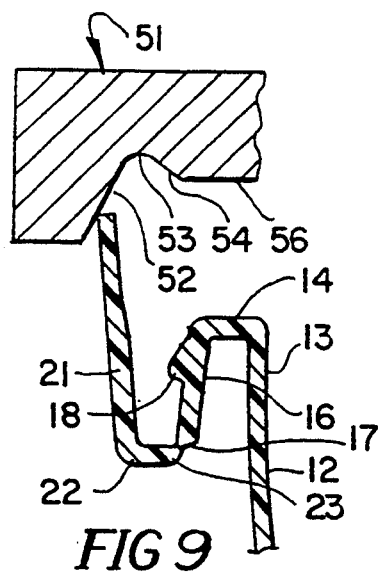
FIGS. 9, 9A, 9B and 9C are schematic views showing bending of the container tamper-evident band by a heated tool; in these figures the lid is not shown.
Figure 9A:
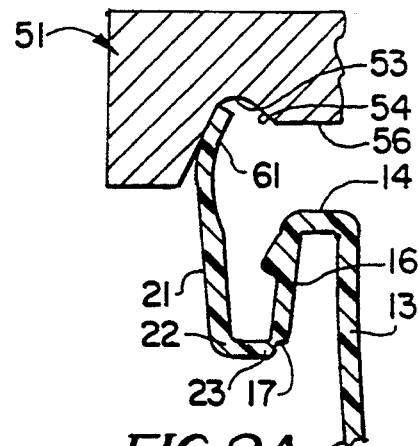
Figure 9B:
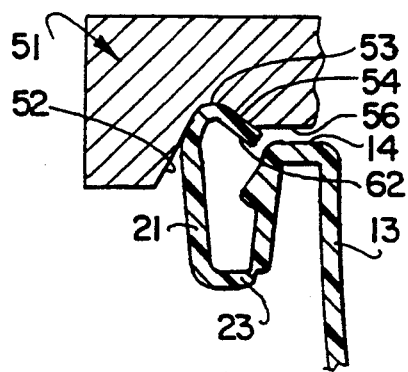
Figure 9C:
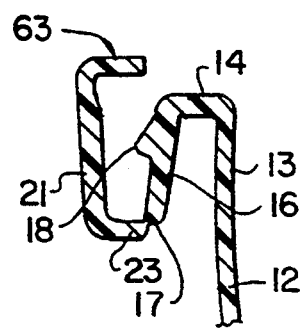

Band 21 maybe formed into an inwardly directed annular projection 63 by a series of steps shown in FIGS. 9 to 9C. For such a purpose a forming tool 51 is used. The underside of tool 51 has an upward-inward slanted wall 52 which merges with a radius 53 which in turn merges with an outward-downward slanted wall 54. Inwardly of wall 54 is the bottom 56 of tool 51. By means which form no part of the present invention, the tool 51 may be heated and also may be moved downwardly relative to container 11.

Figure 8:
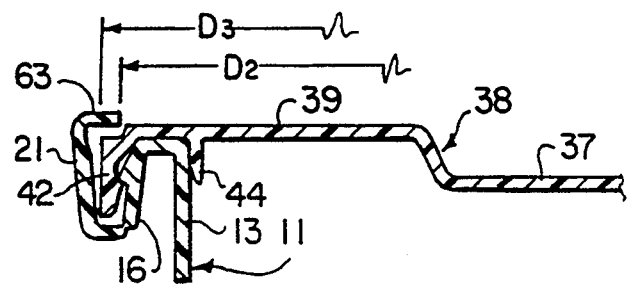
FIG. 8 is a view similar to FIG. 7 showing the band bent into the inwardly directed annular projection.

The first step in the bending of band 21 is illustrated in FIG. 9. Tool 51 is brought down so that the surface 52 contacts the upper edge 73 of band 21. Preferably the tool is heated (for the plastic heretofore defined) to a temperature in the range of 190° to 250° F. for a period of time between 1 and 10 seconds, depending upon the heat employed and the thickness and length of band 21. As shown in FIG. 9A, tool 51 moves downward causing the upper end of band 21 to be formed into an inward curved portion 61. In FIG. 9B it is shown that the downward-inward slant 62 assumes the angle of wall 54. The tool 51 remains stationary at the position of FIG. 9B for about 2 seconds, and during this period of time plastic flow occurs so that when the tool is removed as shown in FIG. 9C and the plastic cools, an effectively ripple-free container projection 63 is formed. Such a projection fits over the ring 39 of lid 36. As best seen in FIG. 8, the minor diameter $D_2$ of projection 63 is less than the maximum diameter $D_3$ of lid 36 and less than diameter $D_1$ shown in FIG. 2.

Figure 10:
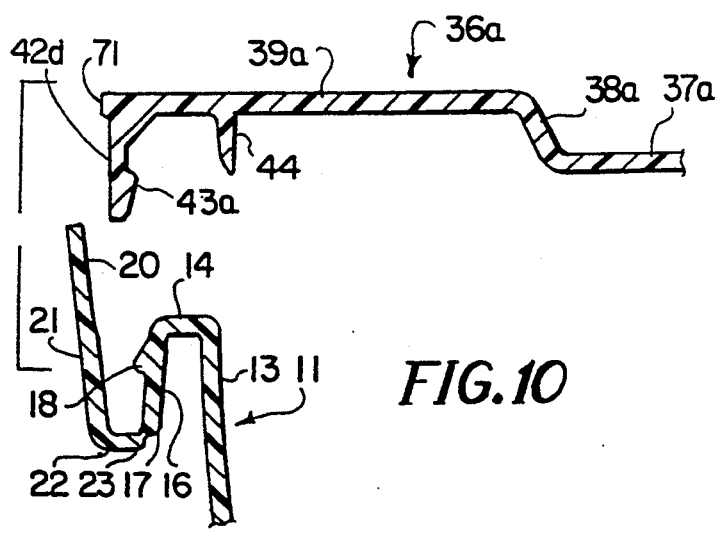
FIGS. 10, 10A, 10B and 10C are schematic views showing an alternate lid construction and alternate forming tool.
Figure 10A:
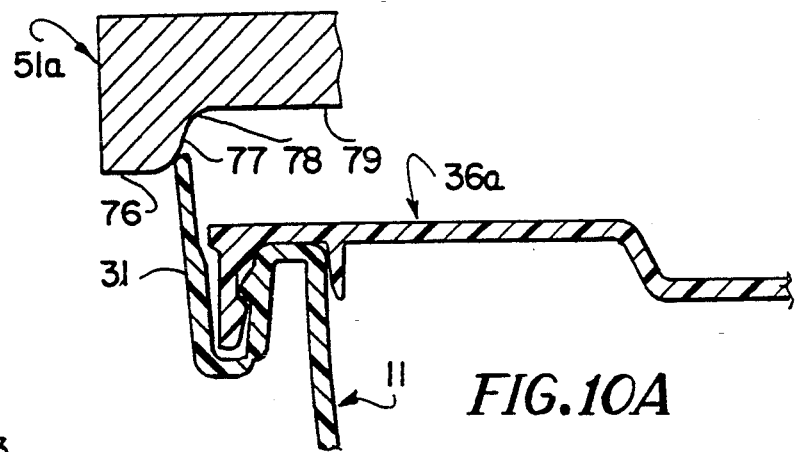
Figure 10B:
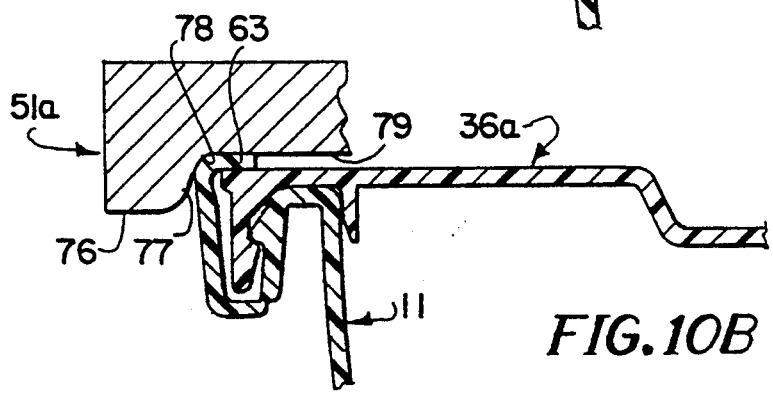
Figure 10C:
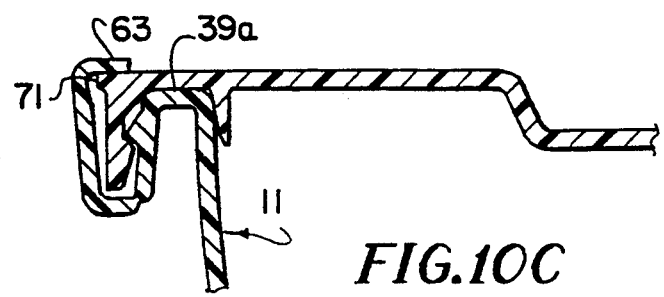

In the modification shown in FIGS. 10-10C, container 11 is substantially the same as in the preceding modification. Lid 36a differs from lid 36 primarily in that it has a narrow peripheral flange 71 projecting beyond skirt 42a instead of notch 41.

Tool 51a has an outer bottom edge 76. Inward-upward slanted wall 77 first contacts and heats the upper edge of band 21 as shown in FIG. 10A. Downward movement of tool 51a causes radius 78 to bend the band inward along the underside of wall 79 and over ring 39a of lid 36a as shown in FIG. 10B. Retainer projection 63a overlies the lid 36a when it cools and retains the lid in place, as shown in FIG. 10C.

Figure 12:
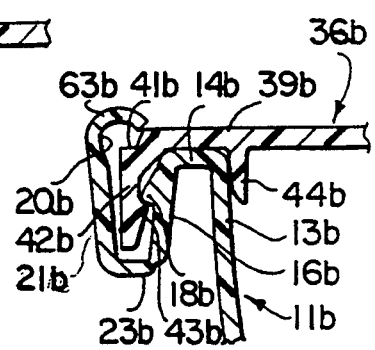
FIG. 12 shows an alternate arcuate structure for the projection.
Figure 11D:
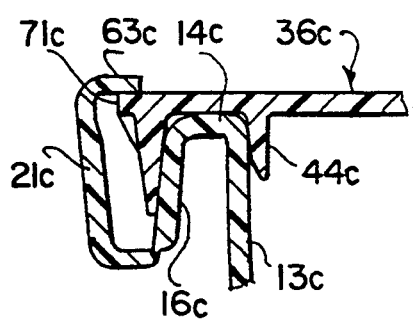

As shown in FIG. 12, instead of projection 63b being flat (as in FIG. 8) it may be arcuate. The inner edge of projection 63b engages the lid 36b to prevent removal, so long as band 21b is intact.

Figure 11A:
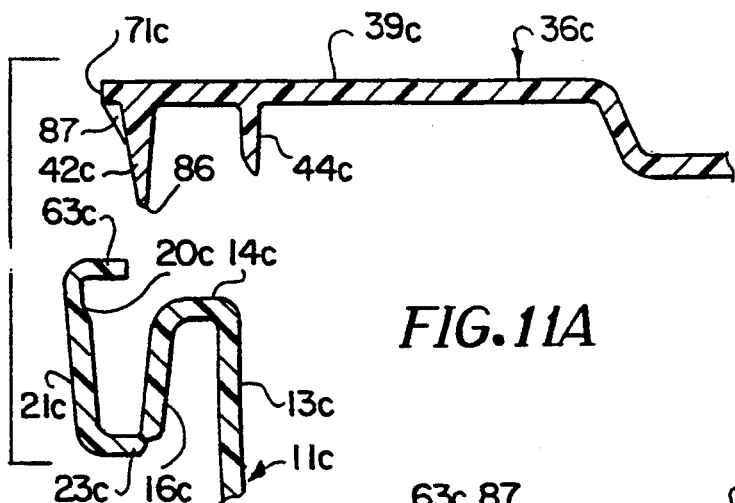
FIGS. 11A, 11B, 11C and lid show an alternate application sequence.
Figure 11B:
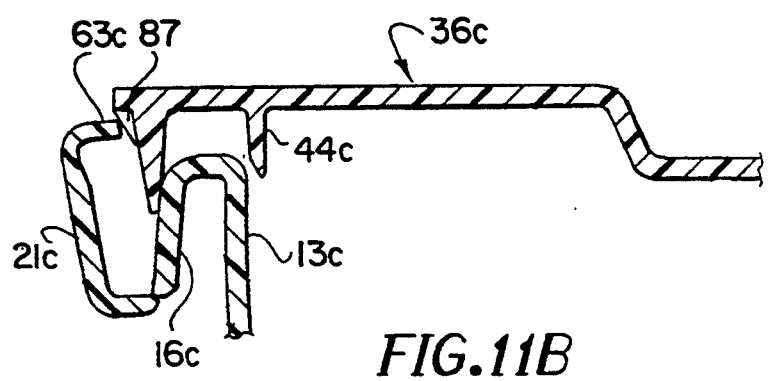
Figure 11C:
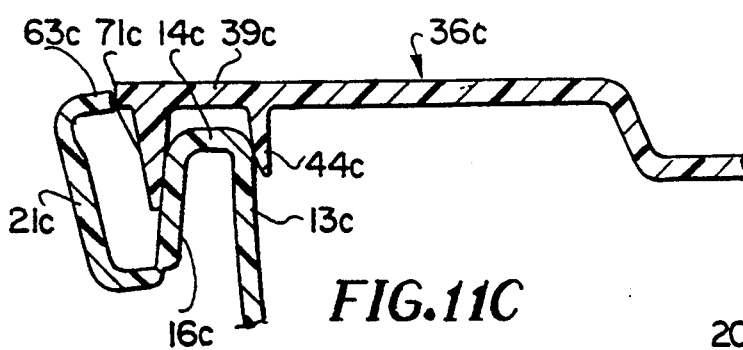

It will be understood that the projection 63C may be formed on container 11C before application of lid 36C. As shown in FIGS. 11A, 11B, 11C and 11D, the lower edge 86 of lid skirt 42C contacts the inner edge of projection 63C and forces the projection 63C outward until the lid snaps under the projection 63C. As shown, skirt 42C tapers downward-inward so that the outside diameter of lower edge 86 is less than the inside diameter of projection 63C. Gussets 87 slant outward-upward to merge with flange 71C. The gussets 87 may be spaced around the periphery of skirt 42C, such as at angles of 10°. As shown in FIG. 11B, gussets 87 contact the inner edge of projection 63C, forcing the projection outward to the position of FIG. 11C, whereupon the lid may be pushed down to seat on lip 14C and projection 63C springs inward on top of lid 36C.

The container lid combination as shown in FIG. 8, 10C, 11C and 12 are tamper-evident since lid 36 may not be removed until projection 63 with band 21 connected thereto is removed. Any attempt to remove the lid causes fracture of at least a portion of the line of weakness of the bridges 23 and gaps 24, which is apparent to the consumer.

When the contents of the container are to be used, the consumer pulls tear tab 27 thereby fracturing connector 32 and then continues pulling around the periphery of the container causing the bridges 23 to break and the band 21 to be disconnected from the container 11. The consumer then pries upwardly on the lower edge of lid skirt 42 causing the beads 43 and 18 to disengage. If the contents of the container 11 are not consumed at one time, the lid 36 may be reapplied with the beads 43 and 18 holding the lid in place against unintentional dislodgement.

In many respects the modification of FIGS. 10–10C, FIGS. 11A–11C and FIG. 12 resemble the preceding modification and the same reference numerals followed by subscript a, b and c respectively denote corresponding parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A container comprising a body having an open end and a lip surrounding said open end, a band spaced outward of said body formed of thin plastic material, means attaching said band to said body, said band initially extending above said lip to define an uppermost diameter, an upper portion of said band being bent to form an inwardly directed annular projection spaced upward relative to said lip, a minor diameter of said projection being less than said uppermost diameter.

2. A container according to claim 1 in which said projection is smooth and wrinkle-free.

3. A container according to claim 2 in which said projection in cross-section is arcuate.

4. A container according to claim 1 in which said means attaching said band to said body is formed with a line of weakness, whereby tampering with said band causes fracture of said means attaching said band to said body at said line of weakness.

5. A container according to claim 4 in which said band is formed with a vertical weakened area and which further comprises a tear tab attached to said band on one side of said weakened area, whereby pulling said tear tab fractures said band at said weakened area and then fractures said means for attaching said band to said body at said line of weakness.

6. A container according to claim 5 in which said band is formed with a notch extending from top to bottom of said band and which further comprises at least one thin connector joined to said band on opposite sides of said notch, said notch comprising said weakened area.

7. A container according to claim 1 in which said means attaching said band to said body comprises a container skirt depending from said lip, said band being located outwardly of said container skirt, said band having an inward extending lower end joined to a lower end of said container skirt.

8. A container according to claim 7 which further comprises a plurality of frangible bridges extending from said lower end of said band to said lower end of said container skirt, said bridges being separated by gaps.

9. A container according to claim 1 in which said band initially flares upwardly-outwardly prior to forming said annular projection.

10. A container according to claim 1 in which as initially molded said band has an upper terminal end extending above said lip thinner than a portion of said band below said upper end.

11. In combination, a container according to claim 1 and a lid to close said open end of said container having a top having a portion engaging said lip, said projection tightly overlying said portion of said lid so that said lid cannot be removed from said body so long as said band is intact.

12. The combination of claim 11 in which said means attaching said band to said body is formed with a line of weakness, whereby tampering with said band causes fracture at said line of weakness.

13. The combination of claim 11 in which said lid portion is annular and which further comprises an outer lid skirt depending from said annular portion engaging said container outside said lip.

14. The combination of claim 13 which further comprises a container skirt depending from said lip formed with external first locking means, said lid skirt being positioned between said container skirt and said band and internal second locking means on said lid skirt cooperable with said first locking means to hold said lid on said container against unintentional dislodgement.

15. The combination of claim 13 which further comprises an inner lid skirt depending from said top engaging said container inside said lip.

16. A container comprising a body having an open end, a band of a curlable material around and spaced outward of an upper end of said body, said band having a portion deformed into a deformed portion extending inwardly relative to said body, means attaching said band to said body, said band having a frangible area and a lid closing off said open end, said deformed portion overlapping a portion of said lid, whereby said lid cannot be removed from said container without breaking said frangible area, said band having an initial uppermost diameter, said deformed portion having a minor diameter less than said initial uppermost diameter.

* * * * *